United States Patent
Yuan

(10) Patent No.: US 9,813,197 B2
(45) Date of Patent: Nov. 7, 2017

(54) METHOD AND SYSTEM FOR COVERAGE ENHANCEMENT OF UPLINK VOIP

(71) Applicant: ZTE (USA) INC., Richardson, TX (US)

(72) Inventor: Yifei Yuan, Iselin, NJ (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

(21) Appl. No.: 14/374,133

(22) PCT Filed: Jan. 28, 2013

(86) PCT No.: PCT/US2013/023368
§ 371 (c)(1),
(2) Date: Jul. 23, 2014

(87) PCT Pub. No.: WO2013/116131
PCT Pub. Date: Aug. 8, 2013

(65) Prior Publication Data
US 2015/0016430 A1 Jan. 15, 2015

Related U.S. Application Data

(60) Provisional application No. 61/592,290, filed on Jan. 30, 2012.

(51) Int. Cl.
*H04J 3/00* (2006.01)
*H04L 1/18* (2006.01)
(Continued)

(52) U.S. Cl.
CPC .......... *H04L 1/1861* (2013.01); *H04L 1/1812* (2013.01); *H04L 1/1822* (2013.01);
(Continued)

(58) Field of Classification Search
CPC .................................................. H04L 1/1861
(Continued)

(56) References Cited

U.S. PATENT DOCUMENTS 8,553,591 B2    10/2013  Jiang et al.
2008/0002688 A1  1/2008  Kim et al.
(Continued)

FOREIGN PATENT DOCUMENTS

CN    101754268 A    6/2010
EP    2265077 A1    12/2010
(Continued)

OTHER PUBLICATIONS

International Search Report for PCT/US2013/023368 mailed Jun. 26, 2013.
(Continued)

*Primary Examiner* — Shripal Khajuria
(74) *Attorney, Agent, or Firm* — Drinker Biddle & Reath LLP

(57) ABSTRACT

Apparatus and methods for improving a coverage of an uplink Voice over IP (VoIP) transmission of a wireless device are disclosed. A wireless device assigns a first hybrid automatic repeat request (HARQ) process to a first VoIP packet of the wireless device. The wireless device then assigns a second HARQ process to a second VoIP packet of the wireless device. The wireless device then transmits the first and second VoIP packets to a base station.

22 Claims, 1 Drawing Sheet

(51) Int. Cl.
*H04L 29/06* (2006.01)
*H04W 72/12* (2009.01)
*H04W 24/02* (2009.01)

(52) U.S. Cl.
CPC .......... *H04L 1/1877* (2013.01); *H04L 1/1887* (2013.01); *H04L 65/1053* (2013.01); *H04W 24/02* (2013.01); *H04W 72/1263* (2013.01)

(58) Field of Classification Search
USPC ....................................................... 370/336
See application file for complete search history.

(56) References Cited

U.S. PATENT DOCUMENTS

| | | | |
|---|---|---|---|
| 2009/0046627 A1* | 2/2009 | Xu | H04W 72/1257 370/328 |
| 2009/0122758 A1 | 5/2009 | Smith et al. | |
| 2009/0307556 A1 | 12/2009 | Cai et al. | |
| 2010/0008348 A1* | 1/2010 | Zhang | H04L 1/1887 370/345 |
| 2010/0192035 A1 | 7/2010 | Sagfors et al. | |
| 2011/0038352 A1 | 2/2011 | Bergman et al. | |
| 2011/0128896 A1 | 6/2011 | Huang et al. | |
| 2011/0310777 A1 | 12/2011 | Jiang et al. | |

FOREIGN PATENT DOCUMENTS

| | | |
|---|---|---|
| EP | 2280505 A1 | 2/2011 |
| JP | 2010530709 A | 9/2010 |
| JP | 2011519535 A | 7/2011 |
| JP | 2011529309 A | 12/2011 |

OTHER PUBLICATIONS

ASUSTeK, Clarification on UE behavior at TTI bundling configuration[online], 3GPP TSG-RAN WG2#64 R2-086144, Nov. 2008.

Ericsson, "On Uplink Coverage for LTE" 3rd Generation Partnership Project (3GPP), Mobile Competence Centre, vol. RAN WG1, Feb. 6, 2008.

European Search Report for Application No. 13743299.3, dated Oct. 22, 2015.

Susitaival, R., et al., "LTE Coverage Improvement by TTI Bundling" 2009 IEE 69th Vehicular Technology Conference, IEEE, 2009, pp. 1-5.

Chinese Office Action for application 201380007171.0, dated Dec. 13, 2016.

* cited by examiner

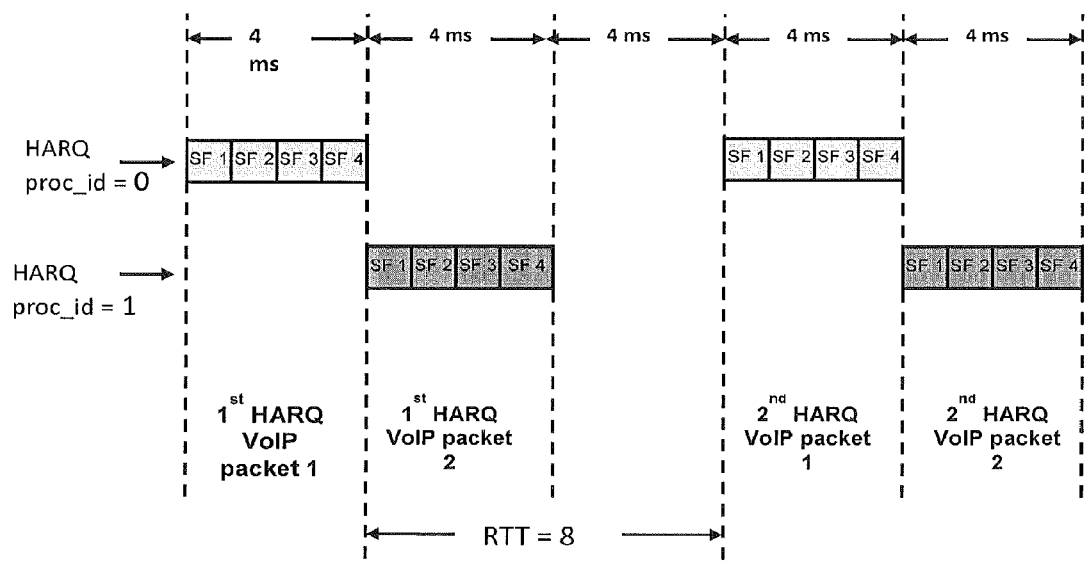

METHOD AND SYSTEM FOR COVERAGE ENHANCEMENT OF UPLINK VOIP

FIELD OF THE INVENTION

The present invention relates to a method and system to enhance the coverage of uplink packet voice application—Voice over IP (VoIP). Specifically, the invention relates to assigning multiple hybrid automatic repeat request (HARQ) processes simultaneously for one VoIP user.

With new technologies such as advanced multi-antennas, carrier aggregation, orthogonal frequency division multiple access (OFDMA), system capacities of cellular networks have been increased significantly. The voice application was traditionally carried over circuit switch networks, with dedicated physical channels. Once the dedicated channel is allocated to a user, it remains to be reserved for that user until the call is ended. To meet the ever growing demand for data traffic, the wireless networks are migrating from circuit voice switch to packet switch. The emerging 4G cellular networks would be full IP serviced, including for voice. The voice application carried over IP networks is called VoIP. Compared to circuit switch voice, VoIP allows dynamic resource allocation to match the voice activities and multiple voice users can compete for the same resources during the calls. Speed coding study shows that when a user is talking over the phone, there is no voice activity for about half of time during which the user is either pausing or remaining silent to listen. VoIP traffic is only allocated with physical resources when the user is in talk spurt, thus significantly improves the resource utilizations. Advanced technologies such as HARQ can be applied for VoIP so that the transmission can adapt to the fast fading of the channel, thereby saving radio resources. With the above features, VoIP generally can increase the voice capacity of a system compared to circuit switch voice.

Although VoIP can deliver higher capacity of voice, its coverage is generally poorer than circuit switch voice. The main reason is the discontinuous transmission of VoIP packet. Discontinuous transmission is a fundamental characteristic of data transmission in 3G and 4G cellular networks. By restricting a data packet within a short transmit time interval (TTI) for example in the order of 1 millisecond, dynamic scheduling can be efficiently carried out. The short TTI also enables fast HARQ retransmission, with round trip time (RTT) in the order of 8-10 milliseconds, which is helpful for link adaptation to fast fading. Since 3G and 4G wireless standards are wideband, typical of 5~20 MHz, the short TTI provides finer granularity for resource allocation at least in time domain, so that smaller packet can also be efficiently scheduled. It also fits the bursty nature of data traffics. However, short TTI and bursty transmission are not favourable to users at cell edges where the coverage is often limited by the maximum transmit power of the terminals for uplink traffics.

The coverage issue of uplink VoIP is studied in Release 8 LTE and the solution is through TTI bundling. Basically, instead of using only one TTI (one millisecond), a VoIP packet is transmitted over 4 TTIs. The adjective "bundling" stresses the fact that these four TTIs are consecutive and the packet would stick to the same physical resources over 4 TTIs. By spreading over 4 TTIs, much lower modulation order and code rate can be used, compared to using just one TTI. Therefore, the uplink VoIP coverage can be improved.

Even with 4 TTI bundling, the coverage of VoIP still cannot match that of circuit switch voice. For example, in 3G UMTS, the TTI of circuit switch voice is 20 milliseconds. In LTE, the TTI of VoIP with TTI bundling is 4 milliseconds. Given that voice packets from upper layer would arrive at physical layer every 20 milliseconds during a talk spurt, the over-the-air transmission should be finished within 20 milliseconds, to avoid the accumulation and delay at the transmission queue. The round trip time (RTT) in the case of 4 TTI bundling is a little longer than without TTI bundling, in the order of 12 to 16 milliseconds. That means the transmission should be finished with two HARQ transmissions. So effectively, about 8 milliseconds are spent on a VoIP packet transmission, which is significantly shorter than 20 millisecond TTI of UMTS circuit switch voice. In another word, the issue of discontinuous transmission is not completely solved by TTI bundling, which leads to the remaining gap in coverage between circuit switch voice and VoIP.

SUMMARY OF THE INVENTION

In accordance with one aspect, the present invention comprises a method of improve the uplink coverage of VoIP by assigning multiple HARQ processes simultaneously for a VoIP user during a talk spurt. Each VoIP packet is assigned an HARQ process.

According to the present invention, different physical resources can be allocated for different HARQ processes of a VoIP user.

According to the present invention, semi-persistent scheduling can be applied to either one of the HARQ processes for a VoIP user.

According to the present invention, TTI bundling can be applied to either one of the HARQ processes for a VoIP user.

In another aspect, the invention comprises a system whose VoIP uplink coverage can be improved by assigning multiple HARQ processes for a VoIP user. The system comprises different physical resources allocated for different HARQ processes of a VoIP user, with possible semi-persistent scheduling and TTI bundling in either one of the HARQ processes.

BRIEF DESCRIPTION OF THE FIGURES

FIG. 1 shows an example of assigning multiple HARQ processes simultaneously for a VoIP user.

DETAILED DESCRIPTION OF THE INVENTION

The invention considers improving the continuity of VoIP transmission by assigning multiple HARQ processes simultaneously for one VoIP user during a talk spurt. In conventional VoIP, one HARQ process is assigned for each VoIP user, in order to simplify the MAC layer and physical layer processing. Since the round trip time (RTT) of HARQ is at least 8 ms, using only one HARQ process results in transmission gap between HARQ (re)transmissions, even when 4 TTI bundling is used.

The invention is illustrated in an example shown in FIG. 1. Two HARQ processes are allocated for this particular VoIP user that is in a talk spurt. Upon two VoIP packets arrive from the upper layer, each VoIP packet would be assigned with an HARQ processes, i.e., VoIP packet 1 is assigned HARQ proc_id=0, with lighter gray color. VoIP packet 2 is assigned HARQ proc_id=1, with darker gray color. Packet 2 is transmitted 4 milliseconds after Packet 1 is transmitted. One TTI or one subframe (SF) equals one millisecond. 4-TTI bundling (over 4 consecutive subframes)

is applied to each HARQ process. Different HARQ processes can use different physical resources as seen in FIG. 1. Semi-persistent scheduling is assumed where the physical resources for each HARQ process remain the same for both initial transmissions ($1^{st}$ HARQ) and retransmissions ($2^{nd}$ HARQ). The round trip time is 8 milliseconds. By assigning two HARQ processes simultaneously, there is only a gap of 4 milliseconds when there is no transmission at all, significantly smaller than assigning only one HARQ process at a time.

FIG. 1 is just one example. In fact, it is found that if 8-TTI bundling is allowed, the gap can be completely eliminated by assigning two HARQ processes simultaneously for a VoIP user.

It should be understood that the methods and devices of the present invention may be executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EEPROM's); and the like. Implementations of certain embodiments may further take the form of machine-implemented, including web-implemented, computer software.

Many modifications and alterations of the new methods and systems described herein may be employed by those skilled in the art without departing from the spirit and scope of the invention which is limited only by the claims.

I claim:

1. A method for improving a coverage of an uplink Voice over IP (VoIP) transmission of a wireless device, the method comprising:
   assigning a first hybrid automatic repeat request (HARQ) process to a first VoIP packet for an initial transmission of the wireless device;
   assigning a second HARQ process to a second VoIP packet for the initial transmission of the wireless device; and
   transmitting the first and second VoIP packets from the wireless device to a base station;
   wherein a sum of transmission times of the first VoIP packet and the second VoIP packet is the same as a round trip time for retransmission for the HARQ process.

2. The method of claim 1, further comprising bundling the first and second HARQ processes over four transmit time intervals.

3. The method of claim 2, wherein the first HARQ process and the second HARQ process are allocated to different physical resources.

4. The method of claim 2, wherein the first and second HARQ packets are transmitted using semi-persistent scheduling.

5. An apparatus for improving a coverage of an uplink Voice over IP (VoIP) transmission,
   the apparatus comprising:
   a wireless device configured to:
   assign a first hybrid automatic repeat request (HARQ) process to a first VoIP packet for an initial transmission of the wireless device;
   assign a second HARQ process to a second VoIP packet for the initial transmission of the wireless device; and
   transmit the first and second VoIP packets from the wireless device to a base station;
   wherein a sum of transmission times of the first VoIP packet and the second VoIP packet is the same as a round trip time for retransmission for the HARQ process.

6. The apparatus of claim 5, wherein the wireless device is further configured to bundle the first and second HARQ processes over four transmit time intervals.

7. The apparatus of claim 6, wherein the first HARQ process and the second HARQ process are allocated to different physical resources.

8. The apparatus of claim 6, wherein the wireless device transmits the first and second HARQ packets using semi-persistent scheduling.

9. An apparatus for improving a coverage of an uplink Voice over IP (VoIP) transmission of a wireless device, the apparatus comprising:
   means for assigning a first hybrid automatic repeat request (HARQ) process to a first VoIP packet for an initial transmission of the wireless device;
   means for assigning a second HARQ process to a second VoIP packet for the initial transmission of the wireless device; and
   means for transmitting the first and second VoIP packets from the wireless device to a base station;
   wherein a sum of transmission times of the first VoIP packet and the second VoIP packet is the same as a round trip time for retransmission for the HARQ process.

10. The apparatus of claim 9, further comprising means for bundling the first and second HARQ processes over four transmit time intervals.

11. The apparatus of claim 10, wherein the first HARQ process and the second HARQ process are allocated to different physical resources.

12. The apparatus of claim 10, wherein the first and second HARQ packets are transmitted using semi-persistent scheduling.

13. A system for improving a coverage of an uplink Voice over IP (VoIP) transmission, the apparatus comprising:
   a wireless device configured to:
   assign a first hybrid automatic repeat request (HARQ) process to a first VoIP packet for an initial transmission of the wireless device;
   assign a second HARQ process to a second VoIP packet for the initial transmission of the wireless device; and
   transmit the first and second VoIP packets from the wireless device to a base station;
   wherein a sum of transmission times of the first VoIP packet and the second VoIP packet is the same as a round trip time for retransmission for the HARQ process.

14. The system of claim 13, wherein the wireless device is further configured to bundle the first and second HARQ processes over four transmit time intervals.

15. The system of claim 14, wherein the first HARQ process and the second HARQ process are allocated to different physical resources.

16. The system of claim 14, wherein the wireless device transmits the first and second HARQ packets using semi-persistent scheduling.

17. An apparatus for improving a coverage of an uplink Voice over IP (VoIP) transmission of a wireless device, the apparatus comprising:
- means for assigning a first hybrid automatic repeat request (HARQ) process to a first VoIP packet for an initial transmission of the wireless device;
- means for assigning a second HARQ process to a second VoIP packet for the initial transmission of the wireless device; and
- means for transmitting the first and second VoIP packets from the wireless device to a base station,
- wherein a sum of transmission times of the first VoIP packet and the second VoIP packet is the same as a round trip time for retransmission for the HARQ process.

18. The system of claim 17, further comprising means for bundling the first and second HARQ processes over four transmit time intervals.

19. The system of claim 18, wherein the first HARQ process and the second HARQ process are allocated to different physical resources.

20. The system of claim 18, wherein the first and second HARQ packets are transmitted using semi-persistent scheduling.

21. The method of claim 1, wherein the sum of transmission times of the first VoIP packet and the second VoIP packet is equal to a HARQ RTT measured from an end of an initial transmission of a failed packet to a beginning of a retransmission of the failed packet, and wherein the initial transmission of the second VoIP packet occurs within the HARQ RTT after the end of the initial transmission of the first VoIP packet.

22. The method of claim 21, wherein the initial transmission of the second VoIP packet immediately follows the initial transmission of the first VoIP packet.

* * * * *